United States Patent [19]
Ciriello

[11] Patent Number: 5,888,332
[45] Date of Patent: Mar. 30, 1999

[54] METHOD OF APPLYING SNOW BOARD SURFACE COVERS

[76] Inventor: Gene Ciriello, 126 Webster Ave., Yonkers, N.Y. 10701

[21] Appl. No.: 711,547

[22] Filed: Sep. 10, 1996

[51] Int. Cl.[6] .......................... B32B 31/12; B32B 31/18; B32B 31/20

[52] U.S. Cl. .................. 156/249; 156/247; 156/267; 156/281; 280/11.12

[58] Field of Search ................................ 156/249, 267, 156/281, 247; 280/11.12

[56] References Cited

U.S. PATENT DOCUMENTS

| | | |
|---|---|---|
| 4,140,330 | 2/1979 | Ferch . |
| 4,259,274 | 3/1981 | Tiitola . |
| 4,409,287 | 10/1983 | Harrison . |
| 5,035,934 | 7/1991 | Tomiyama et al. . |
| 5,229,207 | 7/1993 | Paquette et al. . |
| 5,437,755 | 8/1995 | Lavorel et al. . |
| 5,449,425 | 9/1995 | Renard et al. . |

Primary Examiner—Curtis Mayes

[57] ABSTRACT

A new Tool System and Method of Applying Snow Board Surface Covers for offering a kit of tools and easy steps to follow to redecorate and resurface a snow board. The inventive device includes a snow board, a snow board surface cover, a spray bottle, a squeegee, and a razor blade. In use, the present invention includes 8 steps to follow; where: Step 1. is to "Remove bindings and clean and remove all stickers from the snow board."; Step 2. is to "Wipe down board thoroughly with alcohol."; Step 3. is to "Spray the snow board generously with soapy water and keep it wet."; Step 4. is to "Peel the adhesive backing paper off the surface cover and spray adhesive side with soapy water and re-spray the snow board."; Step 5. is to "Lay the surface cover onto the snow board and adjust it to fit."; Step 6. is to "Squeegee out all bubbles with squeegee provided and work from the middle towards the edges and ends of the snow board."; Step 7. is to "Trim edges of the surface cover with razor provided and re-squeegee to remove any remaining water or air bubbles."; Step B. is to "Let dry over night, mount bindings, and ride."

8 Claims, 3 Drawing Sheets

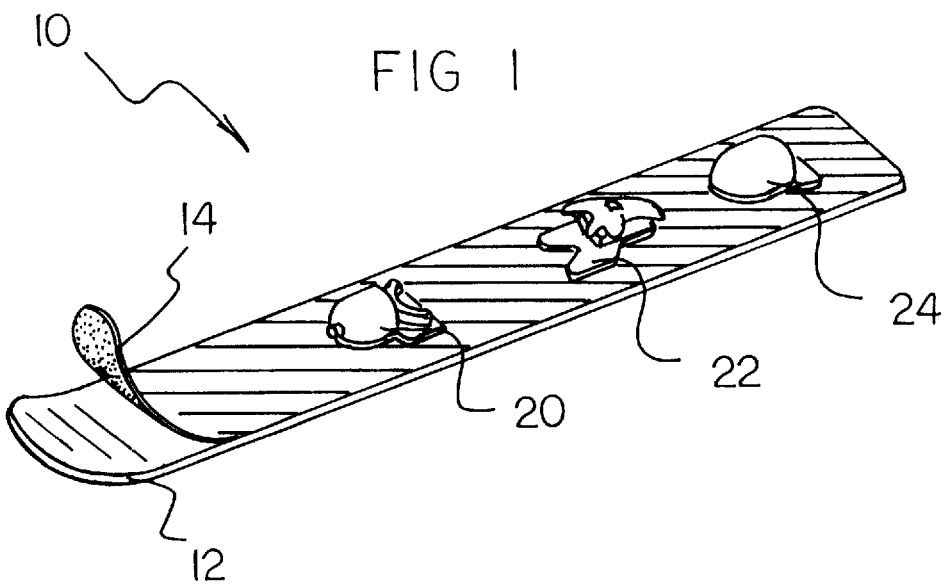
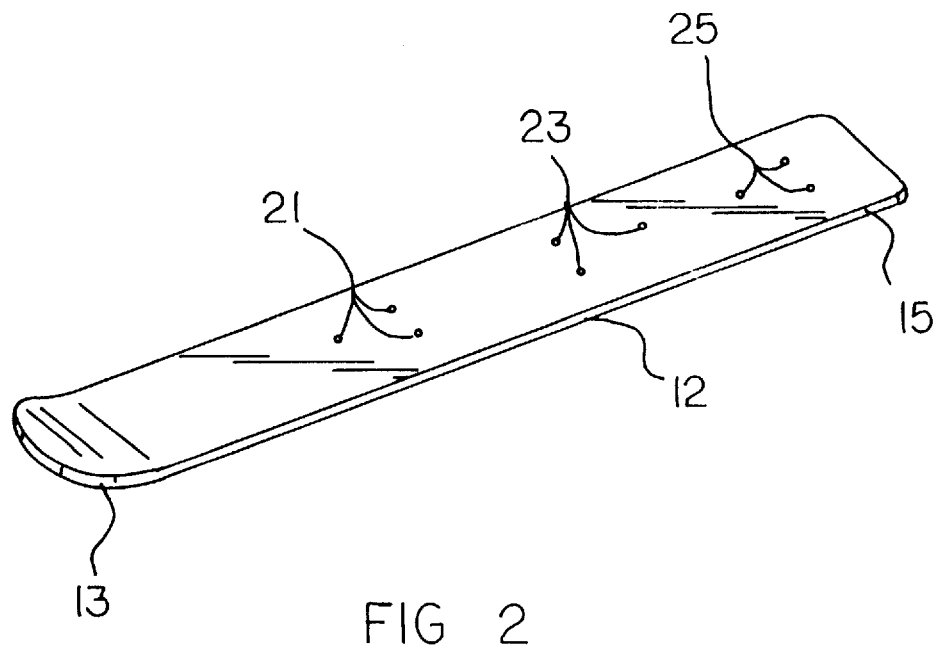

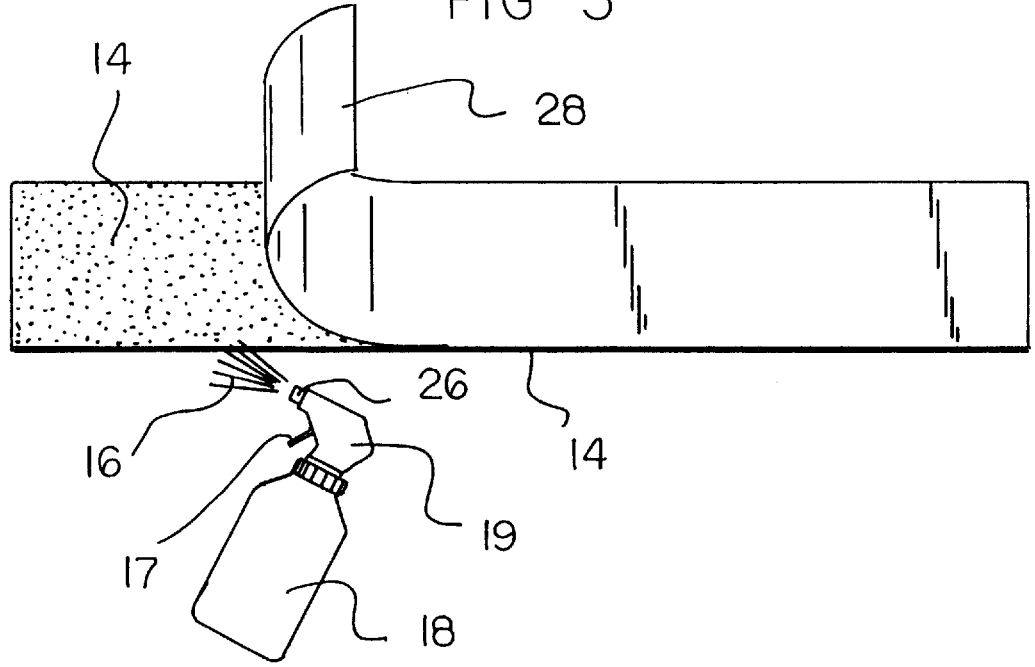
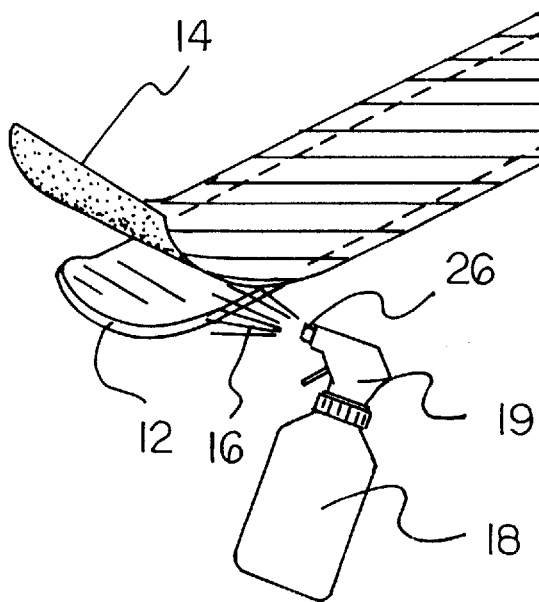

METHOD OF APPLYING SNOW BOARD SURFACE COVERS

BACKGROUND OF THE INVENTION

1. Field of the Invention

The present invention relates to the ornamental design of snow boards and more particularly pertains to a new Tool System and Method of Applying Snow Board Surface Covers for offering a kit of tools and easy steps to follow to redecorate, resurface a snow board, and also to protect the original surface of the board.

2. Description of the Prior Art

The use of the ornamental design of snow boards is known in the prior art. More specifically, the ornamental design of snow boards heretofore devised and utilized are known to consist basically of familiar, expected and obvious structural configurations, notwithstanding the myriad of designs encompassed by the crowded prior art which have been developed for the fulfillment of countless objectives and requirements.

Known prior art the ornamental design of snow boards include U.S. Pat. No. 4,409,287 issued to Harrison on 11 Oct. 1983; U.S. Pat. No. 5,229,207 issued to Paqette et al. on 20 Jul. 1993; U.S. Pat. Des. No. 314,601 issued to Floreani on 12 Feb. 1991; U.S. Pat. No. 5,035,934 issued to Tomiyama et al. on 30 Jul. 1991; U.S. Pat. No. 4,259,274 issued to Titola on 31 Mar. 1981, and U.S. Pat. No. 4,140,330 issued to Ferch on 20 Feb. 1979.

While these devices fulfill their respective, particular objectives and requirements, the aforementioned patents do not disclose a new Tool System and Method of Applying Snow Board Surface Covers. The inventive device includes a snow board, a snow board surface cover, a spray bottle, a squeegee, and a razor blade.

In these respects, the Tool System and Method of Applying Snow Board Surface Covers according to the present invention substantially departs from the conventional concepts and designs of the prior art, and in so doing provides an apparatus primarily developed for the purpose of offering a kit of tools and easy steps to follow to redecorate, resurface a snow board, and also to protect the original surface of the board.

SUMMARY OF THE INVENTION

In view of the foregoing disadvantages inherent in the known types of the ornamental design of snow boards now present in the prior art, the present invention provides a new Tool System and Method of Applying Snow Board Surface Covers construction wherein the same can be utilized for offering a kit of tools and easy steps to follow to redecorate, resurface a snow board, and also protect the original surface of the snow board.

The general purpose of the present invention, which will be described subsequently in greater detail, is to provide a new Tool System and Method of Applying Snow Board Surface Covers apparatus and method which has many of the advantages of the ornamental design of snow boards mentioned heretofore and many novel features that result in a new Tool System and Method of Applying Snow Board Surface Covers which is not anticipated, rendered obvious, suggested, or even implied by any of the prior art the ornamental design of snow boards, either alone or in any combination thereof.

To attain this, the present invention generally comprises a snow board, a snow board surface cover, a spray bottle, a squeegee, and a razor blade.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Tool System and Method of Applying Snow Board Surface Covers apparatus and method which has many of the advantages of the ornamental design of snow boards mentioned heretofore and many novel features that result in a new Tool System and Method of Applying Snow Board Surface Covers which is not anticipated, rendered obvious, suggested, or even implied by any of the prior art the ornamental design of snow boards, either alone or in any combination thereof.

It is another object of the present invention to provide a new Tool System and Method of Applying Snow Board Surface Covers which may be easily and efficiently manufactured and marketed.

It is a further object of the present invention to provide a new Tool System and Method of Applying Snow Board Surface Covers which is of a durable and reliable construction.

An even further object of the present invention is to provide a new Tool System and Method of Applying Snow Board Surface Covers which is susceptible of a low cost of manufacture with regard to both materials and labor, and which accordingly is then susceptible of low prices of sale to the consuming public, thereby making such Tool System and Method of Applying Snow Board Surface Covers economically available to the buying public.

Still yet another object of the present invention is to provide a new Tool System and Method of Applying Snow Board Surface Covers which provides in the apparatuses and methods of the prior art some of the advantages thereof, while simultaneously overcoming some of the disadvantages normally associated therewith.

Still another object of the present invention is to provide a new Tool System and Method of Applying Snow Board Surface Covers for offering a kit of tools and easy steps to follow to redecorate, resurface a snow board, and also protect the original snowboard.

Yet another object of the present invention is to provide a new Tool System and Method of Applying Snow Board Surface Covers which includes a snow board, a snow board surface cover, a spray bottle, a squeegee, and a razor blade.

Still yet another object of the present invention is to provide a new Tool System and Method of Applying Snow Board Surface Covers that allows any one to decorate or personalized a snow board in their own unique way.

Even still another object of the present invention is to provide a new Tool System and Method of Applying Snow Board Surface Covers that does not require a professional shop or professional skill to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed figures wherein:

FIG. 1 is a top right side perspective view of a new Tool System and Method of Applying Snow Board Surface Covers according to the present invention.

FIG. 2 is a bare snow board illustrating the completion of "step 1" of the present invention.

FIG. 3 is an illustration of a surface cover of the present invention.

FIG. 4 is a top right side perspective view of the surface cover being applied to a bare snow board of the invention.

DESCRIPTION OF THE PREFERRED EMBODIMENT

Figures 5, 6:
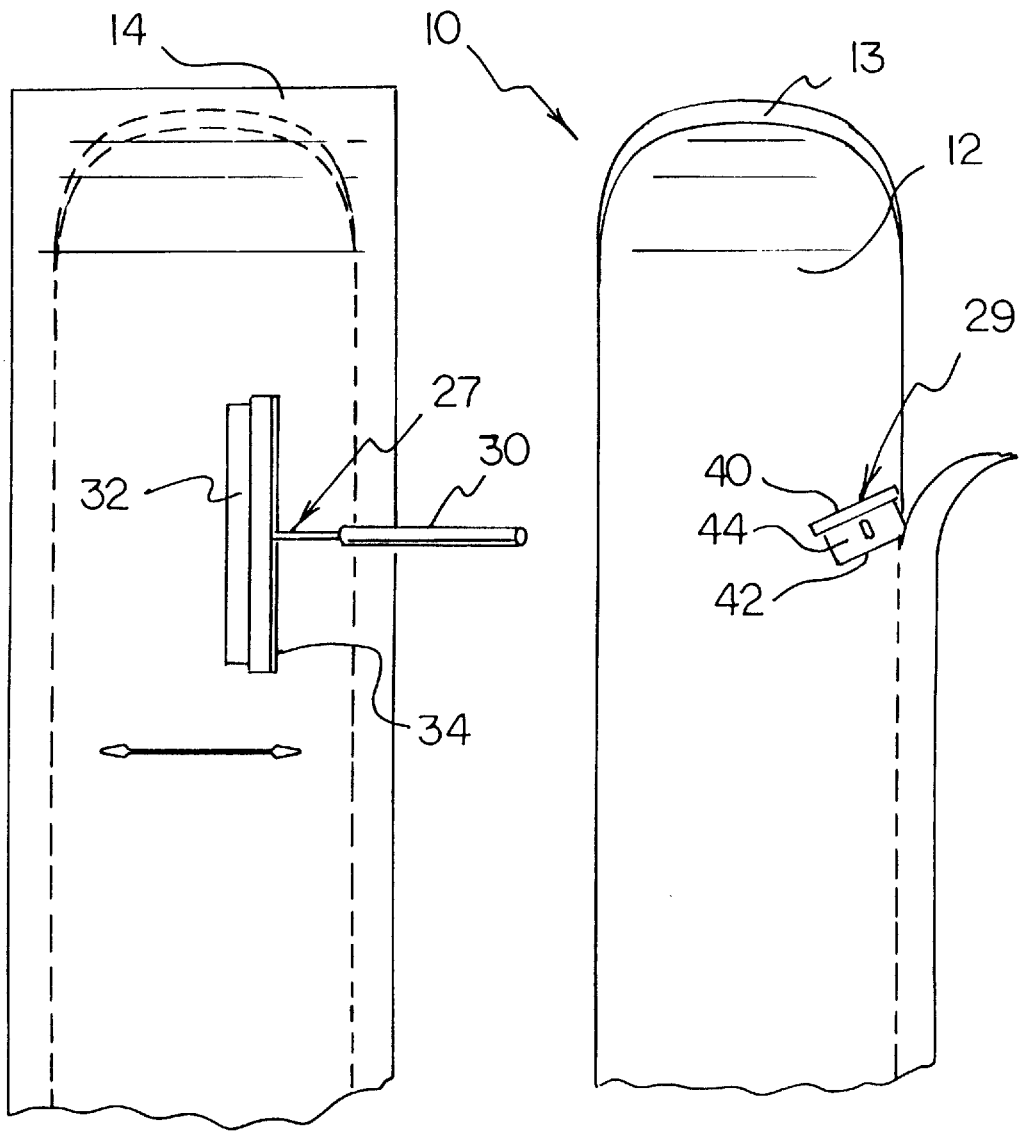
FIG. 5 is an illustration according to "step 6" of the present invention.
FIG. 6 an illustration according to "step 7" of the present invention.

With reference now to the figures, and in particular to FIGS. 1 through 6 thereof, a new Tool System and Method of Applying Snow Board Surface Covers embodying the principles and concepts of the present invention and generally designated by the reference numeral 10 will be described.

More specifically, it will be noted that the Tool System and Method of Applying Snow Board Surface Covers 10 comprises a snow board 12, a surface cover 14, a spray bottle 18, a squeegee 27, and a razor blade 29.

As best illustrated in FIGS. 1 through 6, it can be shown that the snow board 12 further includes a front foot binding 20, a front foot heel binding 22, and a rear foot toe binding 24. The front foot binding 20 is fixed to the snow board 12 by fastener means installed in front toe mounting apertures 21; the front foot heel binding 22 is fixed to the snow board 12 by fastener means installed in front heel mounting apertures 23; and the rear foot toe binding 24 is fixed to the snow board 12 by fastener means installed in rear toe mounting apertures 25.

The surface cover 14 is prepared by pulling back and away an adhesive backing paper 28 and use of the spray bottle 18 which is further comprised of a sprayer head 19, a spray pump trigger 17, and a spray nozzle 26, which sprays a soap spray 16 onto the surface cover 14.

Referring to FIG. 4, the surface cover 14 is applied to the top surface of the snow board 12. Then referring to FIGS. 5 and 6, the surface cover 14 is firmly pressed onto the snow board 12 by use of a squeegee 27 which is further comprised of a squeegee handle 30, a squeegee head 34, and a squeegee blade 32. Likewise, the surface cover 14 is trimmed back to the edges of the snow board 12 by use of a razor blade 29 which is further comprised of a razor blade handle 40, a razor blade cutting edge 42, and a razor blade base 44.

In use, the present invention includes 8 steps to follow; where:

Step 1. is to "Remove bindings and clean and remove all stickers from the snow board 12."

Step 2. is to "Wipe down the snow board 12 thoroughly with alcohol."

Step 3. is to "Spray the snow board 12 generously with soapy water and keep it wet."

Step 4. is to "Peel the adhesive backing paper 28 off the surface cover 14 and spray adhesive side with soapy water and re-spray the snow board 12."

Step 5. is to "Lay the surface cover 14 onto the snow board 12 and adjust it to fit."

Step 6. is to "Squeegee out all bubbles with squeegee 27 provided and work from the middle towards the edges and ends of the snow board 12."

Step 7. is to "Trim edges of the surface cover 14 with razor bade 29 provided and re-squeegee to remove any remaining water or air bubbles."

Step 8. is to "Let dry over night, mount bindings, and ride."

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the figures and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of applying snow board surface covers, the method comprising:

providing a snow board having bindings for receiving a pair of feet;

providing a snow board surface cover having an adhesive side;

providing a spray bottle containing a soapy water solution therein;

providing a squeegee;

providing a razor blade;

removing the bindings from the snowboard;

removing any stickers from the snow board;

wiping the snow board with alcohol;

spraying the snow board with the soapy water solution and continuing to spray the snow board such that it stays wet with the soapy water solution;

spraying the adhesive side of the surface cover with the soapy water solution;

laying the adhesive side of the surface cover onto the snow board;

squeegeeing out any bubbles between the surface cover and the snowboard with the squeegee by moving the squeegee from a middle portion of the snowboard towards the edges and ends of the snow board;

trimming edges of the surface cover extending beyond the snow board with the razor blade and re-squeegeeing to remove any remaining water or air bubbles;

drying over night; and remounting the bindings.

2. The method of applying snow board surface covers of claim 1, further comprising the step of cleaning the snow board when removing the stickers from said snow board.

3. The method of applying snow board surface covers of claim 1, wherein the bindings comprise a front foot binding, a front foot heel binding, and a rear foot toe binding and further comprising the step of removing the front foot binding, the front foot heel binding, and the rear foot toe binding.

4. The method of applying snow board surface covers of claim 3, wherein the front foot binding is fixed to the snow board by fastener means installed in front toe mounting apertures, the front foot heel binding being fixed to the snow board by fastener means installed in front heel mounting apertures, the rear foot toe binding being fixed to the snow board by fastener means installed in rear toe mounting apertures and further comprising the step of removing the fastener means from the bindings.

5. The method of applying snow board surface covers of claim 1, wherein the squeegee comprises a squeegee handle, a squeegee head, and a squeegee blade and further comprising the step of grasping the squeegee handle and using the squeegee blade to remove any air bubbles from the surface cover and the snowboard.

6. The method of applying snow board surface covers of claim 1, wherein the razor blade comprises a razor blade handle, a razor blade cutting edge, and a razor blade base and further comprising the step of trimming the edges of the surface cover with the razor blade cutting edge.

7. The method of applying snow board surface covers of claim 1, wherein the adhesive side of the snow board surface cover is covered with an adhesive backing and further comprising the step of peeling the adhesive backing off the surface cover and spraying the adhesive side of the surface cover with the soapy water solution.

8. A method of applying snow board surface covers, the method comprising:

providing a snow board having bindings for receiving a pair of feet, the bindings comprising a front foot binding, a front foot heel binding, and a rear foot toe binding, the front foot binding being fixed to the snow board by fastener means installed in front toe mounting apertures, the front foot heel binding being fixed to the snow board by fastener means installed in front heel mounting apertures, the rear foot toe binding being fixed to the snow board by fastener means installed in rear toe mounting apertures;

providing a snow board surface cover having an adhesive side covered with an adhesive backing;

providing a spray bottle containing a soapy water solution therein;

providing a squeegee comprising a squeegee handle, a squeegee head, and a squeegee blade;

providing a razor blade comprising a razor blade handle, a razor blade cutting edge, and a razor blade base;

removing the bindings from the snowboard;

removing any stickers from the snow board;

cleaning the snow board when removing the stickers from the snow board;

wiping the snow board with alcohol;

spraying the snow board with the soapy water solution and continuing to spray the snow board such that it stays wet with the soapy water solution;

peeling the adhesive backing off the surface cover and spraying an adhesive side of the surface cover with the soapy water solution;

laying the adhesive side of the surface cover onto the snow board;

squeegeeing out bubbles between the surface cover and the snow board with the squeegee by moving the squeegee from a middle portion of the snowboard towards the edges and ends of the snow board;

trimming edges of the surface cover extending beyond the snow board with the razor blade and re-squeegeeing to remove any remaining water or air bubbles;

drying over night; and remounting the bindings.

* * * * *